April 4, 1967 F. K. BECKER ETAL 3,312,901

BIPOLAR VESTIGIAL SIDEBAND DATA SIGNAL DETECTOR

Filed Nov. 4, 1963 2 Sheets-Sheet 1

INVENTORS F. K. BECKER
B. R. SALTZBERG
BY J. P. Kearns
ATTORNEY

United States Patent Office 3,312,901
Patented Apr. 4, 1967

3,312,901
BIPOLAR VESTIGIAL SIDEBAND DATA SIGNAL DETECTOR

Floyd K. Becker, Colts Neck, and Burton R. Saltzberg, Middletown, N.J., assignors to Bell Telephone Laboratories, Incorporated, New York, N.Y., a corporation of New York Filed Nov. 4, 1963, Ser. No. 321,156
7 Claims. (Cl. 325—50)

This invention relates to vestigial sideband signal transmission systems in general and to an improved synchronous detector for such a system in particular.

In the copending joint application of F. K. Becker and J. R. Davey Ser. No. 117,747 filed June 16, 1961, now Patent No. 3,152,305, a vestigial sideband transmission system for bipolar data signals is disclosed. In order to facilitate the use of synchronous detection techniques at the receiver a small quadrature carrier component is transmitted in addition to the carrier reversals by means of which the data is encoded. Furthermore, low-frequency components are suppressed from the baseband data signals to furnish a guard space about the position of the quadrature carrier component. Special provision is then required at the receiver to restore the low-frequency components of the signal wave that are suppressed at the transmitter.

It is an object of this invention to transmit a bipolar data signal by vestigial sideband techniques and to detect such a signal without the necessity of suppressing any low-frequency baseband components at the transmitter.

It is a further object of this invention to provide a synchronous detector for a vestigial sideband data signal that is immune to perturbations of the carrier frequency due to the presence of low-frequency components in the baseband data signal.

It is another object of this invention to simplify the detection of data signals transmitted by vestigial sideband techniques.

According to this invention, a bipolar data signal modulates by phase reversals a carrier frequency signal. To the modulated signal is added a controlled amount of carrier in quadrature with the information-bearing phases with but a slight increase in total power over a suppressed-carrier signal. The resultant phase angle of the line signal is fixed relative to a reference quadrature carrier phase for steady mark and steady space signals. One sideband of the composite signal is removed before application to the transmission line in a vestigial sideband filter.

After bandpass filtering of the received signal to remove out-of-band noise and other interference the signal is presented to a first phase-locked loop including a product modulator, a local oscillator and a low-pass filter. The product modulator acts as a detector of the phase between the incoming signal and the output of the oscillator. The error voltage in the output of the modulator adjusts the phase and frequency of the oscillator until the phase of the oscillator leads that of the incoming signal by 90 degrees. The time constant of the low-pass filter is established small enough to respond to the reference carrier within the data bit interval. The fundamental component of the oscillator output, extracted in a tuned circuit, drives two phase-shift networks which introduce phase leads equal to the sum and difference from 90 degrees of the steady mark and steady space phase angles.

The outputs of these phase shifters are switched, under the control of the output data in a "bootstrap" arrangement to a further product modulator also driven by a voltage-controlled oscillator. A feedback loop from the modulator to the oscillator includes a low-pass filter with a relatively long time constant. Because of the sluggishness of this control loop the oscillator is largely unperturbed by the operation of the switch between the phase shifters and the product modulator, provided the output data is correctly predicted. The output of the second oscillator is used as the demodulating carrier and is always in quadrature with the reference carrier. A final product modulator is driven jointly by the output of the second oscillator and the incoming line signal. The resultant baseband signal is filtered and sliced in the conventional manner to obtain baseband data. The output of the slicer, in addition to representing the detected data, also controls the switch between the phase shift networks and the intermediate product modulator.

A feature of this invention is the bookstrap feedback of detected data signals to control the phase of a voltage-controlled local oscillator for improved synchronous detection of vestigial sideband data signals.

An important advantage of this invention is the improved tolerance to delay and amplitude distortion introduced by the transmission medium and the relaxed requirements on automatic gain control of the incoming signal.

Further objects, features and advantages of this invention will become apparent upon consideration of the following detailed description and the drawing in which.

Various techniques have been proposed for the high-speed transmission of data signals in narrow bandwidths such as is found in the existing far flung voice-frequency band telephone transmission network. A promising mode of transmission is that by vestigial sideband techniques, where most of one sideband is suppressed before transmission. Each sideband of a double-sideband signal carries all of the intelligence and this redundancy wastes both power and bandwidth. Vestigial signals, however, are relatively more difficult to detect at a receiver without introducing distortion. Synchronous detection in which a local carrier is regenerated at the receiving terminal requires precise phase control of a local oscillator in synchronism with the modulating carrier wave in the case of data signals. With voice signals there is relatively little low-frequency content to perturb the carrier component transmitted. Data signals, however, include a substantial direct-current component which interferes with the phase of the transmitted carrier component. This invention provides a unique solution to the problem of transmitted carrier perturbation.

Figure 1:
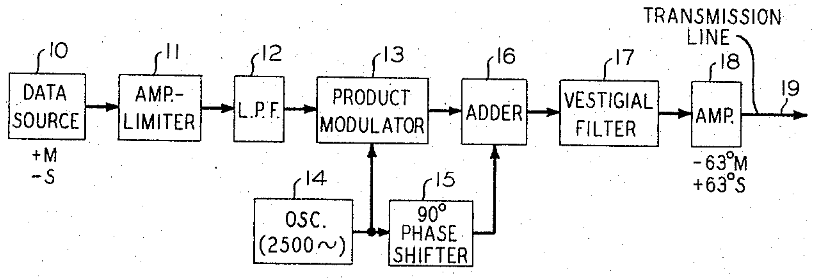
FIG. 1 is a block diagram of a transmitter for producing a vestigial sideband data signal with a quadrature reference carrier component.

FIG. 1 depicts in block diagram form a vestigial sideband bipolar data transmitter. As in the cited copending application a carrier component is transmitted in quadrature with the component that is modulated by the data signal. However, no guard space is provided about the carrier location.

Block 10 represents a data source in which marking or "one" signals appear as positive potentials and spacing or "zero" signals, as negative potentials. These potentials are standardized according to well known techniques in amplifier-limiter 11. Low-pass filter 12, cutting off near the high-frequency end of the voice-frequency band, for example, provides shaping and avoids foldover after modulation. A carrier frequency wave, say at 2500 cycles per second for voice band transmission, is generated in block 14. This carrier wave controls a switch-type modulator 13 in a conventional manner. A balanced modulator is assumed in which the carrier component is suppressed and double sidebands result. Marks and spaces are encoded as opposite phases of the carrier frequency. To this modulated signal is added in adder 16 a low-level carrier frequency component supplied through 90-degree phase-shift network 15 in quadrature with that supplying the modulator. The composite signal from adder 16 is passed through vestigial sideband filter 17 to eliminate unwanted moduation products as well as most of the upper sideband. The signal is finally amplified in block 18 and applied to transmission line 19. No low-frequency components are suppressed from the bipolar data signal.

The power of the quadrature carrier component is arbitrarily set at 6 decibels below that of the information-bearing signal in a specific practical embodiment. The total power is thus raised by only 1.0 decibel over a single-sideband, suppressed-carrier signal. Since the reference carrier component is in quadrature with the information bearing signal, the resultant phase angle for steady space and mark data is plus and minus 63 degrees referred to the transmitted carrier component.

Figure 2:
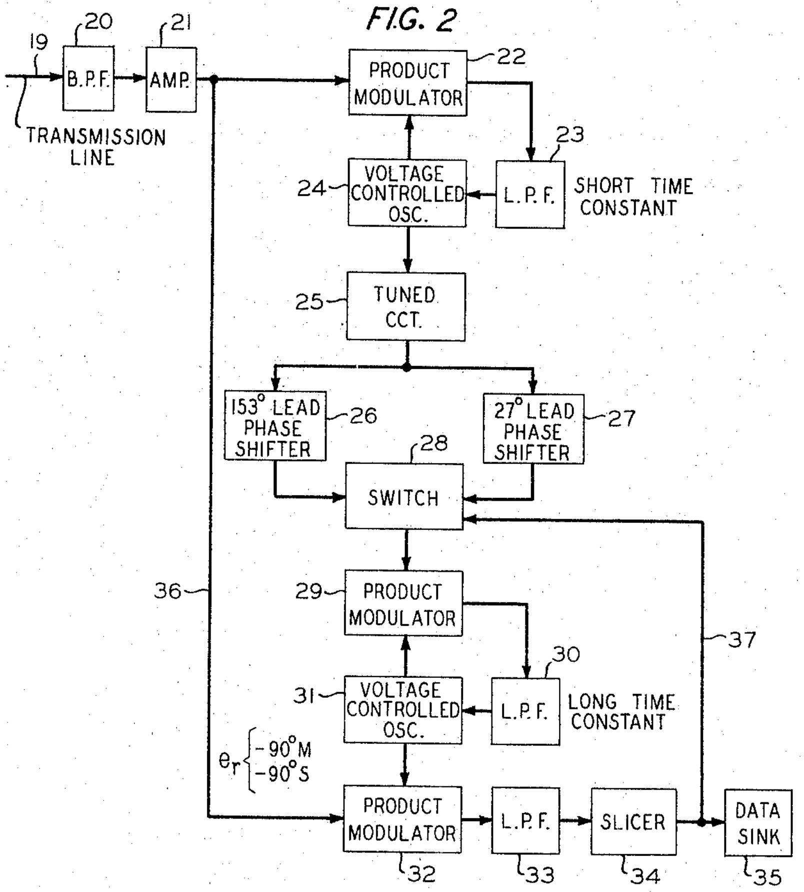
FIG. 2 is a block diagram of a vestigial sideband signal receiver employing a synchronous detection system according to this invention.

FIG. 2 illustrates a receiver system for the signal generated in the transmitter of FIG. 1 which will compensate for any perturbations in the reference carrier component due to low-frequency components in the information bearing data signals.

The incoming line signal on transmission line 19 is filtered in bandpass filter 20, having a cutoff frequency near the limits of the voice band, to remove out-of-band noise and other interference. The signal is then amplified in amplifier 21 to a suitable level and presented to a first phase-locked loop. This loop includes product modulator 22, low-pass filter 23 and voltage-controlled oscillator 24. Product modulator 22 acts as a detector of the phase difference between the incoming line signal and the output of oscillator 24, which has a nominal free-running frequency equal to that of the transmitted carrier. The error signal emerging at the right of modulator 22 is filtered in filter 23 and is applied as a control on the frequency of oscillator 24 in a well known manner. Oscillator 24 can advantageously be a free-running transistor multivibrator whose frequency depends on the potential at its base electrodes. In the absence of frequency offset, the phase of oscillator 24 leads that of the input signal by 90 degrees. This is the only stable state of the loop.

The time constant of the low-pass filter in the control loop is relatively short but long enough for the bandwidth of the phase-locked loop to be much narrower than the cutoff region of the vestigial sideband filter in the transmitter. The line signal may, therefore, be considered as a narrow, double-sideband signal as far as the operation of the phase-locked loop is concerned. In certain cases it is advisable, in order to insure this condition, to place a bandpass filter complementary in characteristic to the vestigial sideband filter ahead of modulator 22.

The output of oscillator 24 is applied to tuned circuit 25 to extract the fundamental component therefrom as a sine wave. This wave leads the input wave by 90 degrees. For a steady marking signal the output of the tuned circuit is at plus 27 degrees relative to the reference carrier phase; and for a steady spacing signal, at plus 153 degrees relative to the reference carrier phase. Between marking and spacing signals there then is an abrupt 126-degree phase shift.

The output of tuned circuit 25 is applied to two phase-shift networks 26 and 27 which impart either a 27-degree or 153-degree phase shift thereto. If the 27-degree phase corresponding to a steady marking signal is shifted 153 degrees in network 26 and the steady spacing signal is shifted 27 degrees in network 27, then the output phase is 180 degrees from the reference carrier for either marking or spacing signals. The outputs of the phase-shift networks are brought to a switch 28 to accomplish this normalizing action. Switch 28 is controlled in a bootstrap arrangement from the demodulated data in a manner to be described below.

A second phase-locked loop is driven by switch 28. This loop is similar to the first loop and includes product modulator 29, low-pass filter 30 and voltage controlled oscillator 31. This loop differs from the first loop only in the time constant of its low-pass filter, which is relatively long to prevent the oscillator from responding to the phase transitions generated by the changes in phase from space to mark and vice versa. Since the second loop locks in at 90 degrees leading from the control signal, its output is at minus 90 degrees relative to the reference carrier. This is precisely the phase required for demodulating the incoming data signal. Therefore, the output of the second loop provides the correct demodulating carrier.

The incoming signal after amplification in amplifier 21 is applied over lead 36 to product modulator 32, which also receives the output of oscillator 31. The output of modulator 32 therefore includes components separated by 180 degrees representing the marks and spaces in the information-bearing signal. This output is passed through low-pass filter 33 to remove unwanted higher-frequency modulation products and to provide proper shaping. The resultant baseband signal is sliced in slicer 34 in a conventional manner to produce a bipolar output to data sink or utilization device 35. Slicer 34 can advantageously be a bistable threshold circuit of the Schmitt trigger type.

Figure 3:
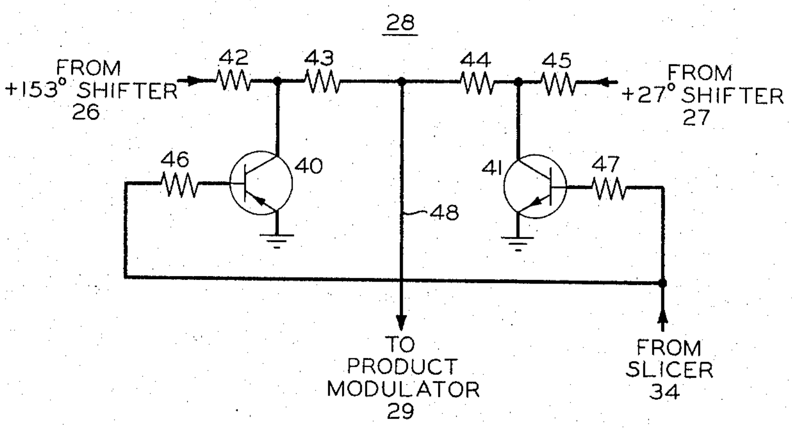
FIG. 3 is a circuit diagram of a suitable switch for use in the practice of this invention.

The slicer output is also used over lead 37 to control switch 28. Switch 28 can be advantageously implemented as shown in FIG. 3. Complementary junction transistors 40 and 41 have their base electrodes connected in parallel to the output from slicer 34, through isolating resistors 46 and 47. The emitter electrodes are grounded as shown. The collector electrodes are connected to taps on an isolating resistive network including series resistors 42 through 45 to the outputs of phase-shift networks 26 and 27 and to product modulator 29 as shown. A positive marking output turns n-p-n transistor 41 on, while holding p-n-p transistor 40 off, to ground the output of the 27-degree phase-shift network 27 and to allow the output of 153-degree network 26 to be connected to modulator 29 over lead 48. Conversely, a negative spacing output turns p-n-p transistor 40 on to ground the output of 153-degree phase-shift network 26 and to allow the output of 27-degree network 27 to be connected to modulator 29 over lead 48. The slicer output changes very rapidly at the beginning of a bit interval and operates switch 28 promptly. Therefore, there exists only a brief instant when the wrong phase is incident on product modulator 29. The sluggishness of the second phase-locked loop is such that there is negligible response to this transition phase and oscillator 31 experiences only a slight amount of jitter. For random data switch 28 spends equal time in each position and thus an average phase halfway between the phases of the two network outputs controls the second phase-locked loop. Only at the start of a data sequence is there any tendency for the switch to operate out of phase, but this situation is self correcting after the first few data bits.

Figure 4:
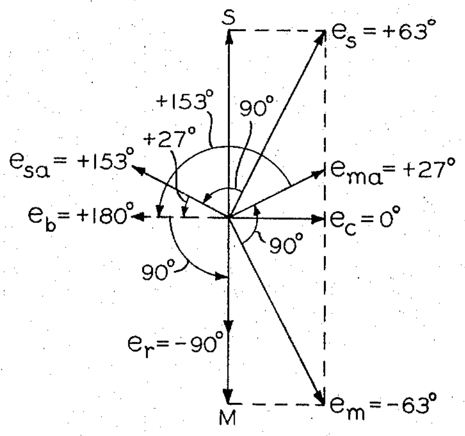
FIG. 4 is a vector diagram explanatory of the phase relations encountered in the type of phase-modulated carrier signal operated on by this invention.

FIG. 4 is a vector diagram of the phase angles encountered in the receiver according to this invention. The vertical vectors marked M and S are the phases of the carrier wave appearing in the output of modulator 13 in the transmitter. The horizontal vector $e_c$ indicates the phase of the reduced-level quadrature carrier component obtained from phase shifter 15 in the transmitter. The addition of this vector to the mark and space vectors yields the resultant line signal vectors $e_m$ and $e_s$ at 63 degrees lagging and leading the reference carrier vector $e_c$. In the first phase-locked loop of the receiver these vectors are rotated 90 degrees to the positions indicated by vectors $e_{ma}$ and $e_{sa}$ at plus 27 and plus 153 degrees, respectively, ahead of the reference vector. Vector $e_{ma}$ is further rotated to position $e_b$ by 153-degree phase-shift network 26; and vector $e_{sa}$, to the same position $e_b$ by 27-degree phase-shift network 27. Therefore, by proper control of switch 28 product modulator 29 always sees the same phase except during a brief transition instant as the switch is operated. The second phase-locked loop rotates vector $e_b$ to position $e_r$ 90 degrees behind the reference vector, to form the demodulating carrier component. Vector $e_r$ reacts with the incoming signal in modulator 32 to recover the marks and spaces of the data in the 180-degree opposed vertical positions.

It is to be understood that the above-described arrangement is only illustrative of the application of the principles of the invention. Numerous other arrangements may be devised by those skilled in the art without departing from the spirit and scope of this invention. For example, the specific values of phase angle described in connection with the practical embodiment are illustrative only and are not to be considered limitative. The principle of the invention is valid at other angles as may be appreciated by those skilled in the art.

What is claimed is:

1. A receiver for binary data signals appearing as phase reversals of a suppressed carrier wave in which a quadrature carrier-wave component is reinserted at a reduced level and one sideband is suppressed to form a vestigial sideband line signal so that the binary data signals are encoded as phase angles leading and lagging the phase of the reinserted carrier wave component by a predetermined angle less than 90 degrees comprising a first phase-locked oscillator loop controlled by said line signal producing an output in quadrature with the instantaneous line signal phase angles, a pair of phase-shifting networks driven in parallel by the output of said first oscillator, one or the other of said networks being capable of rotating the phase of the output of said first oscillator corresponding to a particular binary signal to a common phase-opposed relation to said reinserted carrier-wave component, a second phase-locked oscillator loop selectively driven by one or the other of said phase-shifting networks according to which binary signal is detected and having an output in quadrature with the phase of said reinserted carrier-wave component, modulator means jointly responsive to the output of said second oscillator and to said line signal producing output signals of opposite polarity corresponding to each type of binary signal, and a switching circuit controlled by the output of said modulator connecting the proper one of said phase-shifting networks to said second oscillator to maintain the output of said second oscillator in quadrature with said reinserted carrier-wave component.

2. The receiver according to claim 1 in which said first and second phase-locked oscillator loops comprise a product modulator, a voltage-controlled oscillator whose output frequency is determined by the direct-current potential at its input, means directly connecting said oscillator to said product modulator, and a feedback path between said modulator and the input of said oscillator including a low-pass filter with preassigned time constant for extracting the direct-current component from said modulator as a control on the frequency of said oscillator.

3. The receiver according to claim 2 in which the low-pass filter associated with said first oscillator has a short time constant relative to the rate at which data is transmitted so that said first oscillator follows the instantaneous phase changes in said line signal and the low-pass filter associated with said second oscillator has a long time constant relative to the rate at which data is transmitted so that the second oscillator is rendered incapable of responding instantaneously to the phase changes resulting from the operation of said switching circuit.

4. The receiver according to claim 1 in which said switching circuit comprises a pair of complementary junction transistors, each having base, emitter and collector electrodes, means for returning said emitter electrodes to a common potential point, means for connecting said base electrodes to the output of said second oscillator, a resistive network in series between said phase-shifting networks, a center tapping on said resistive network connected to said second oscillator, and intermediate tappings on said resistive network between said center tapping and said phase-shifting networks connected to said collector electrodes, one or the other of said phase-shifting networks being shunted to said common potential point according to the polarity of the output derived from said second oscillator.

5. In combination, a data source having a bipolar output signal, a source of carrier waves, means modulating said bipolar output signal on said carrier wave as phase reversals and suppressing said carrier wave, means phase-shifting said carrier wave by 90 degrees, means for combining said phase-shifted carrier with said modulated carrier wave to form a composite wave in which particular data signals are encoded as phase angles leading and lagging the phase-shifted carrier wave by a predetermined phase angle, a vestigial sideband filter driven by said combining means for suppressing one sideband of said composite wave, a transmission line of restricted bandwidth connected to said filter, first controlled oscillator means responsive to instantaneous phase changes in said composite wave connected to said transmission line, tuned circuit means resonant at the frequency of said carrier wave driven by said first oscillator means, a first phase-shifting network connected to said tuned circuit means for normalizing the phase angle corresponding to one particular data signal to an angle in phase opposition to said transmitted carrier-wave component, a second phase-shifting network connected to said tuned circuit means for normalizing the phase angle corresponding to the other particular data signal to an angle in phase opposition to said transmitted carrier-wave component, switching means connected to said first and second phase-shifting networks having an output terminal to which only one network can be connected at a time, second controlled oscillator means connected to said switching means relatively unresponsive to instantaneous phase changes caused by the operation of said switching means and having an output at the frequency of said carrier wave and shifted 90 degrees with respect to said transmitted carrier-wave component, modulator means for combining the output of said second oscillator means with the composite signal on said transmission line, bistable slicing means connected to said modulator means for recovering a bipolar data signal therefrom, means connecting said slicing means to said switching means to cause operation of said switching means in synchronism with said recovered data signal, and a data sink accepting said recovered data signal.

6. A synchronous detector for a vestigial sideband data signal having a reinserted quadrature carrier-wave component a first phase-locked oscillator loop, a low-pass filter included in said loop having a time constant short relative to the period of the data signal so that the oscillator is held in close phase synchronism with the incoming data signal, a resonant circuit driven by said first loop and tuned to the frequency of said carrier-wave component, a pair of phase-shift networks suitable for rotating the oscillator phases passed by said resonant circuit and corresponding to the particular data signals into phase-opposition with said carrier-wave component, a second phase-locked oscillator loop having an output maintained in quadrature with the transmitted carrier component, a low-pass filter included in said loop having a time constant long relative to the period data signal so that the oscillator operates at substantially constant phase, modulator means for combining the incoming data signal with the output of said second loop to recover said data signals, and switching means responsive to said recovered data signals alternately connecting each of said pair of phase-shift networks to said second loop to control the frequency thereof.

7. In a binary data transmission and reception system, the combination with a transmitter having means producing a phase-shifted vestigial sideband signal with a reduced-level quadrature carrier-wave component, the resultant transmitted phases being of the order of plus and minus 63 degrees relative to the reinserted carrier-wave component, of a receiver for decoding the data signals therefrom, said receiver comprising a first oscillator free-running at the frequency of said carrier wave, means phase-locking said first oscillator in quadrature with the resultant transmitted phases at angles of either 27 or 153 degrees relative to said carrier-wave component, phase-shifting networks driven by said first oscillator capable of imparting additional phase shifts of 27 or 153 degrees to an input signal, a second oscillator having an output at the frequency of said carrier wave, means phase locking said second oscillator in quadrature with said carrier-wave component, said means including switching means for alternatingly connecting said second oscillator to said phase-shifting networks according to whether the decoded data signal is marking or spacing, means for modulating the transmitted signal with the output of said second oscillator to decode the transmitted data signal as a bipolar wave, and means operating said switching means in accordance with the polarity of the bipolar wave from said modulating means.

References Cited by the Examiner

UNITED STATES PATENTS

| | | | |
|---|---|---|---|
| 3,152,305 | 10/1964 | Becker et al. | 325—50 |
| 3,199,037 | 8/1965 | Graves | 328—155 |

DAVID G. REDINBAUGH, *Primary Examiner.*

W. S. FROMMER, *Assistant Examiner.*